United States Patent
Lee et al.

(10) Patent No.: US 9,392,348 B2
(45) Date of Patent: *Jul. 12, 2016

(54) PATH COMPUTATION ELEMENT PROTOCOL (PCEP) OPERATIONS TO SUPPORT WAVELENGTH SWITCHED OPTICAL NETWORK ROUTING, WAVELENGTH ASSIGNMENT, AND IMPAIRMENT VALIDATION

(71) Applicant: Futurewei Technologies, Inc., Plano, TX (US)

(72) Inventors: Young Lee, Plano, TX (US); Greg Bernstein, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/535,918

(22) Filed: Nov. 7, 2014

(65) Prior Publication Data

US 2015/0063804 A1    Mar. 5, 2015

Related U.S. Application Data

(63) Continuation of application No. 13/685,015, filed on Nov. 26, 2012, now Pat. No. 8,923,695, which is a continuation of application No. 12/710,757, filed on Feb. 23, 2010, now Pat. No. 8,346,079.

(60) Provisional application No. 61/156,287, filed on Feb. 27, 2009.

(51) Int. Cl.
*H04B 10/00* (2013.01)
*H04Q 11/00* (2006.01)
(Continued)

(52) U.S. Cl.
CPC ........ *H04Q 11/0062* (2013.01); *H04J 14/0227* (2013.01); *H04J 14/0257* (2013.01);
(Continued)

(58) Field of Classification Search
USPC ..................................... 398/45–57
See application file for complete search history.

(56) References Cited

U.S. PATENT DOCUMENTS

| 8,346,079 B2 * | 1/2013 | Lee ..................... H04J 14/0227 398/45 |
| 8,433,192 B2 * | 4/2013 | Frankel ............. H04B 10/0795 398/16 |

(Continued)

FOREIGN PATENT DOCUMENTS

| EP | 2063585 A1 | 5/2009 |
| WO | 2008046322 A1 | 4/2008 |

OTHER PUBLICATIONS

Ash, J., Ed., et al., "Path Computation Element (PCE) Communication Protocol Generic Requirements," Network Working Group, RFC 4657, Sep. 2006, 21 pages.

(Continued)

*Primary Examiner* — Agustin Bello
(74) *Attorney, Agent, or Firm* — Conley Rose, P.C.; Grant Rodolph; Jonathan K. Polk

(57) ABSTRACT

An apparatus comprising a path computation element (PCE) configured for at least partial impairment aware routing and wavelength assignment (RWA) and to communicate with a path computation client (PCC) based on a PCE protocol (PCEP) that supports path routing, wavelength assignment (WA), and impairment validation (IV). The PCEP comprises at least one operation selected from the group consisting of a new RWA path request operation and a path re-optimization request operation. Also disclosed is a network component comprising at least one processor configured to implement a method comprising establishing a PCEP session with a PCC, receiving path computation information comprising RWA information and constraints from the PCC, and establishing impairment aware RWA (IA-RWA) based on the path computation information and a private impairment information for a vendor's equipment.

12 Claims, 12 Drawing Sheets

(51) Int. Cl.
*H04J 14/02* (2006.01)
*H04L 12/751* (2013.01)
*H04L 12/717* (2013.01)
*H04L 12/721* (2013.01)

(52) U.S. Cl.
CPC ......... *H04J14/0267* (2013.01); *H04J 14/0271* (2013.01); *H04L 45/02* (2013.01); *H04L 45/42* (2013.01); *H04L 45/44* (2013.01); *H04L 45/62* (2013.01); *H04Q 11/0005* (2013.01); *H04J 14/0258* (2013.01); *H04J 14/0269* (2013.01); *H04Q 2011/0073* (2013.01); *H04Q 2011/0086* (2013.01)

(56) References Cited

U.S. PATENT DOCUMENTS

| | | | | |
|---|---|---|---|---|
| 8,923,695 | B2* | 12/2014 | Lee | H04J 14/0227 398/45 |
| 2001/0029543 | A1* | 10/2001 | Iwata | H04L 45/00 709/233 |
| 2006/0155873 | A1* | 7/2006 | Twata | H04L 45/00 709/240 |
| 2008/0056717 | A1* | 3/2008 | Niven-Jenkins | H04J 14/0227 398/57 |
| 2008/0225723 | A1 | 9/2008 | Lee et al. | |
| 2010/0142943 | A1* | 6/2010 | Frankel | H04B 10/0795 398/25 |
| 2010/0183308 | A1* | 7/2010 | Gerstel | H04Q 11/0062 398/79 |
| 2010/0220996 | A1* | 9/2010 | Lee | H04J 14/0227 398/25 |
| 2011/0013908 | A1* | 1/2011 | Gazzola | H04L 41/12 398/48 |
| 2013/0007266 | A1* | 1/2013 | Jocha | H04L 45/00 709/224 |
| 2013/0010612 | A1* | 1/2013 | Lee | H04L 45/62 370/248 |
| 2013/0077970 | A1* | 3/2013 | Lee | H04J 14/0227 398/48 |
| 2013/0236169 | A1* | 9/2013 | Gaudette | H04B 10/0793 398/25 |
| 2015/0063804 | A1* | 3/2015 | Lee | H04J 14/0227 398/49 |

OTHER PUBLICATIONS

Azodolmolky, S., et al., "A Survey on Physical Layer Impairments Aware Routing and Wavelength Assignment Algorithms in Optical Networks," Elsevier, Dec. 11, 2008, 20 pages.
Bradner, S., "Key Words for Use in RFCs to Indicate Requirement Levels," Network Working Group, RFC 2119, Mar. 1997, 3 pages.
Berger, L., Ed., "Generalized Multi-Protocol Label Switching (GMPLS) Signaling Functional Description," Network Working Group, RFC 3471, Jan. 2003, 31 pages.
Berger, L., Ed., "Generalized Multi-Protocol Label Switching (GMPLS) Signaling Resource Reservation Protocol-Traffic Engineering (RSVP-TE) Extensions," Network Working Group, RFC 3473, Jan. 2003, 43 pages.
Bernstein, G., et al., "Framework for GMPLS and PCE Control of Wavelength Switched Optical Networks," Network Working Group, Internet Draft, draft-bernstein-ccamp-wavelength-switched-02.txt, Oct. 25, 2007, 68 pages.
Bernstein, G., et al., "Framework for GMPLS and PCE Control of Wavelength Switched Optical Networks," Network Working Group, Internet Draft, draft-bernstein-ccamp-wavelength-switched-03.txt, Feb. 19, 2008, 68 pages.
Bernstein, G., et al., "A Framework for the Control and Measurement of Wavelength Switched Optical Networks (WSON) with Impairments," Network Working Group, Internet Draft, draft-bernstein-ccamp-wson-impairments-01.txt, Oct. 29, 2008, 23 pages.
Bernstein, G., et al., "A Framework for the Control and Measurement of Wavelength Switched Optical Networks (WSON) with Impairments," Network Working Group, Internet Draft, draft-bernstein-ccamp-wson-impairments-02.txt, Feb. 6, 2009, 31 pages.
Farrel, A., et al., "Conveying Vendor-Specific Constraints in the Path Computation Element Protocol," Network Working Group, Internet Draft, draft-farrel-pce-vendor-constraints-02.txt, Nov. 2, 2008, 10 pages.
Farrel, A., et al., "A Path Computation Element (PCE)-Based Architecture," Network Working Group, RFC 4655, Aug. 2006, 38 pages.
King, Daniel, et al., "Path Computation Architectures Overview in Multi-domain Optical Networks Based on ITU-T ASON and IETF PCE," IEEE, 2008, 8 pages.
Lee, Y., et al., "A Framework for the Control of Wavelength Switched Optical Networks (WSON) with Impairments," Network Working Group, Internet Draft, draft-ietf-ccamp-wson-impairments-01.txt, Oct. 22, 2009, 36 pages.
Lee, Y., et al., "Path Computation Element Communication Protocol (PCEP) Requirements and Protocol Extensions in Support of Global Concurrent Optimization," Network Working Group, Internet Draft, draft-ietf-pce-global-concurrent-optimization-08.txt, Jan. 5, 2009, 28 pages.
Lee, Y., et al., "Alternative Approaches to Traffic Engineering Database Creation and Maintenance for Path Computation Elements," PCE, Internet Draft, draft-lee-pce-ted-alternatives-00.txt, Sep. 26, 2008, 22 pages.
Lee, Y., et al., "Alternative Approaches to Traffic Engineering Database Creation and Maintenance for Path Computation Elements," PCE, Internet Draft, draft-lee-pce-ted-alternatives-01.txt, Feb. 25, 2009, 23 pages.
Lee, Y., et al., "PCEP Requirements for WSON Impairments," Network Working Group, Internet Draft, draft-lee-pce-wson-impairments-00.txt, Jun. 29, 2009, 15 pages.
Lee, Y., et al., "PCEP Requirements for WSON Impairments," Network Working Group, Internet Draft, draft-lee-pce-wson-impairments-01.txt, Dec. 15, 2009, 16 pages.
Lee, Y., et al., "Path Computation Element Communication Protocol (PCEP) Requirements and Extensions for the Support of Wavelength Switched Optical Networks," Network Working Group, Internet Draft, draft-lee-pce-wson-routing-wavelength-00.txt, Oct. 29, 2007, 21 pages.
Lee, Y., et al., "PCEP Requirements and Extensions for WSON Routing and Wavelength Assignment," Network Working Group, Internet Draft, draft-lee-pce-wson-routing-wavelength-03.txt, Oct. 27, 2008, 18 pages.
Lee, Y., et al., "PCEP Requirements for WSON Routing and Wavelength Assignment," Network Working Group, Internet Draft, draft-lee-pce-wson-routing-wavelength-05.txt, Jun. 29, 2009, 12 pages.
Lee, Y., et al., "Path Computation Element Communication Protocol (PCEP) Requirements and Protocol Extensions in Support of Global Concurrent Optimization," Network Working Group, RFC 5557, Jul. 2009, 27 pages.
Leroux, J.L., et al., "Encoding of Objective Functions in the Path Computation Element Communication Protocol, (PCEP)," Network Working Group, Internet Draft, draft-ietf-pce-of-06.txt, Dec. 27, 2008, 21 pages.
Leroux, J.L., Ed., et al., "OSPF Protocol Extensions for Path Computation Element (PCE) Discovery," Network Working Group, RFC 5088, Jan. 2008, 19 pages.
Leroux, J.L., Ed., et al., "IS-IS Protocol Extensions for Path Computation Element (PCE) Discovery," Network Working Group, RFC 5089, Jan. 2008, 16 pages.
Leroux, J.L., Ed., et al., "Encoding of Objective Functions in the Path Computation Element Communication Protocol (PCEP)," Network Working Group, RFC 5541, Jun. 2009, 24 pages.
Vasseur, J.P., Ed., et al., "Path Computation Element (PCE) Communication Protocol (PCEP)," Network Working Group, Internet Draft, draft-ietf-pce-pcep-19.txt, Nov. 17, 2008, 90 pages.
Vasseur, J.P., Ed., et al., "Path Computation Element (PCE) Communication Protocol (PCEP)," Network Working Group, RFC 5440, Mar. 2009, 88 pages.

(56) References Cited

OTHER PUBLICATIONS

Vasseur, JP. Ed., et al., "Path Computation Element (PCE) Communication Protocol (PCEP)," draft-ietf-pce-pcep-09.txt, Nov. 16, 2007, 75 pages.
Foreign Communication From a Related Counterpart Application, European Application No. 10745833.3, Extended European Search Report dated Aug. 1, 2011, 9 pages.
Foreign Communication From a Related Counterpart Application, PCT Application PCT/CN2010/070767, International Search Report dated Apr. 22, 2010, 6 pages.
Foreign Communication From a Related Counterpart Application, PCT Application PCT/CN2010/070767, Written Opinion dated Apr. 22, 2010, 4 pages.
Foreign Communication From a Counterpart Application, European Application No. 10745833.3, European Office Action dated Jan. 24, 2014, 7 pages.
Pre-Interview Communication dated Jul. 17, 2012, U.S. Appl. No. 12/710,757, filed Feb. 23, 2010, 13 pages.
Notice of Allowance dated Sep. 19, 2012, U.S. Appl. No. 12/710,757, filed Feb. 23, 2010, 22 pages.
Le Roux, J., et al., "Encoding of Objective Functions in the Path Computation Element Communication Protocol (PCEP)," draft-ietf-pce-of-06.txt, Dec. 27, 2008, 40 pages.
Le Roux, J., Ed., et al., "IS-IS Protocol Extensions for Path Computation Element (PCE) Discovery," RFC 5089, Jan. 2008, 17 pages.
Notice of Allowance dated Aug. 29, 2014, 8 pages, U.S. Appl. No. 13/685,015, filed Nov. 26, 2012, 8 pages.

\* cited by examiner

PATH COMPUTATION ELEMENT PROTOCOL (PCEP) OPERATIONS TO SUPPORT WAVELENGTH SWITCHED OPTICAL NETWORK ROUTING, WAVELENGTH ASSIGNMENT, AND IMPAIRMENT VALIDATION

CROSS-REFERENCE TO RELATED APPLICATIONS

The present application is a continuation of U.S. patent application Ser. No. 13/685,015 filed Nov. 26, 2012 by Young Lee, et al., and entitled "Path Computation Element Protocol (PCEP) Operations to Support Wavelength Switched Optical Network Routing, Wavelength Assignment, and Impairment Validation," which is a continuation of U.S. patent application Ser. No. 12/710,757 filed Feb. 23, 2010 by Young Lee, et al., and entitled "Path Computation Element Protocol (PCEP) Operations to Support Wavelength Switched Optical Network Routing, Wavelength Assignment, and Impairment Validation", which claims priority to U.S. Provisional Patent Application No. 61/156,287 filed Feb. 27, 2009 by Young Lee, et al., and entitled "Path Computation Element System Architecture and Functional Requirement to Support Wavelength Switched Optical Network Routing, Wavelength Assignment, and Impairment Validation," all of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) during path computation for the various signals that are being transported through the network at any given time. Unlike traditional circuit-switched and connection-oriented packet-switched networks that merely have to determine a route for the data stream across the network, WDM networks are burdened with the additional constraint of having to ensure that the same wavelength is not simultaneously used by two signals over a single fiber. This constraint is compounded by the fact that WDM networks typically use specific optical bands comprising a finite number of usable optical wavelengths. As such, the RWA continues to be one of the challenges in implementing WDM technology in optical networks.

Path computations can also be constrained due to other issues, such as excessive optical noise, along the lightpath. An optical signal that propagates along a path may be altered by various physical processes in the optical fibers and devices, which the signal encounters. When the alteration to the signal causes signal degradation, such physical processes are referred to as "optical impairments." Optical impairments can accumulate along the path traversed by the signal and should be considered during path selection in WSONs to ensure signal propagation, e.g. from an ingress point to an egress point, with acceptable amount of degradation.

SUMMARY

In one embodiment, the disclosure includes an apparatus comprising a path computation element (PCE) configured for at least partial impairment aware routing and wavelength assignment (RWA) and to communicate with a path computation client (PCC) based on a PCE protocol (PCEP) that supports path routing, wavelength assignment (WA), and impairment validation (IV). The PCEP includes at least one operation selected from the group consisting of a new RWA path request operation and a path re-optimization request operation.

In another embodiment, the disclosure includes a network component comprising at least one processor configured to implement a method comprising establishing a PCEP session with a PCC, receiving path computation information comprising RWA information and constraints from the PCC, establishing impairment aware RWA (IA-RWA) based on the path computation information and a private impairment information for a vendor's equipment. The method performed by the network component also includes selectively transmitting at least one of a new RWA path request and a RWA path re-optimization request to the PCC.

In yet another embodiment, the disclosure includes a method comprising establishing impairment aware routing and wavelength assignment for a plurality of NEs in an optical network using routing and combined WA and IV. The method also includes performing at least one operation selected from the group consisting of a new RWA path request operation and a path re-optimization request operation.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
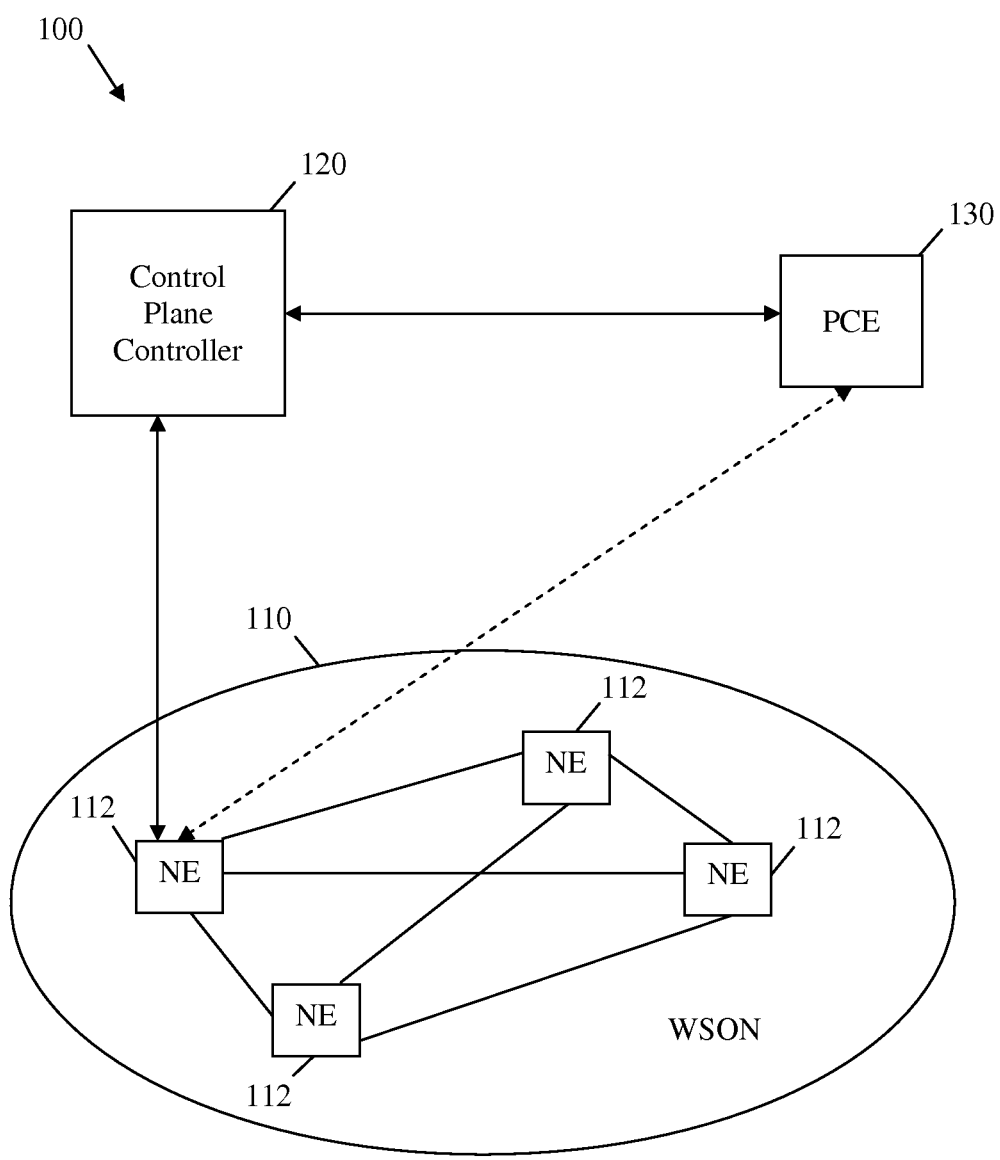
FIG. 1 is a schematic diagram of an embodiment of a WSON system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To ensure proper operations in optical networks, a plurality of network components (e.g. NEs, subsystems, devices, cabling, etc.) may be characterized at a detailed level. The detailed characteristics of such network components may be considered during network planning, installation, and turn-up phases. Additionally, the network component characteristics may be used during day-to-day operations, such as for computing and establishing lightpaths and monitoring connections. The detailed characteristics may comprise optical impairment due to physical processes in the components.

In a PCE-based Architecture, a PCE may compute Label Switched Paths (LSP) in Multiprotocol Label Switching Traffic Engineering (MPLS-TE) and Generalized MPLS (GMPLS) networks at the request of PCCs. A PCC may be any network component that makes such a request and may be for instance an Optical Switching Element within a WDM network. The PCE, itself, may be located anywhere within the network, and may be within an optical switching element, a Network Management System (NMS) or Operational Support System (OSS), or may be an independent network server.

PCEP is the communication protocol used between PCC and PCE, and may also be used between cooperating PCEs. Disclosed herein are application-specific requirements for PCEP for the support of Wavelength Switched Optical Networks (WSONs). As used herein, each WSON refers to a WDM based optical network in which switching is performed selectively based on the wavelength of an optical signal. Lightpath provisioning in WSONs requires a RWA process. From a path computation perspective, wavelength assignment is the process of determining which wavelength can be used on each hop of a path and forms an additional routing constraint to optical light path computation. Additionally, optical impairments may add further constraints on the paths available for use.

The paths in a WSON are referred to as lightpaths. Each lightpath may span multiple fiber links and each path should be assigned a wavelength for each link. A transparent optical network is made up of optical devices that can switch but not convert from one wavelength to another. In a transparent optical network, a lightpath operates on the same wavelength across all fiber links that it traverses. In such cases, the lightpath is said to satisfy the wavelength-continuity constraint. Two lightpaths that share a common fiber link can not be assigned the same wavelength. To do otherwise would result in both signals interfering with each other. Note that additional multiplexing techniques such as polarization based multiplexing are not addressed herein. Assigning the proper wavelength on a lightpath is an essential requirement in the optical path computation process.

On the other hand, when a switching node has the ability to perform wavelength conversion, the wavelength-continuity constraint can be relaxed, and a lightpath may use different wavelengths on different links along its route from origin to destination. It is, however, to be noted that wavelength converters may be limited due to their relatively high cost. The number of WDM channels that can be supported in a fiber is also limited. In accordance with at least some embodiments, a WSON may be composed of network nodes that cannot perform wavelength conversion, nodes with limited wavelength conversion, and nodes with full wavelength conversion abilities. Accordingly, wavelength assignment is an additional routing constraint to be considered in all lightpath computations.

Some optical sub-networks are designed such that over any path the degradation to an optical signal due to impairments never exceeds prescribed bounds. This may be due to the limited geographic extent of the network, the network topology, and/or the quality of the fiber and devices employed. In such networks, the path selection problem reduces to determining a continuous wavelength from source to destination (the Routing and Wavelength Assignment problem). In other optical networks, impairments are important and the path selection process must be impairment-aware.

One of the most basic questions in communications is whether one can successfully transmit information from a transmitter to a receiver within a prescribed error tolerance, usually specified as a maximum permissible bit error ratio (BER). This generally depends on the nature of the signal transmitted between the sender and receiver and the nature of the communications channel between the sender and receiver. The optical path utilized (along with the wavelength) determines the communications channel.

The optical impairments incurred by the signal along the fiber and at each optical network element along the path determine whether the BER performance or any other measure of signal quality can be met for this particular signal on this particular path. Given the existing standards covering optical characteristics (impairments) and the knowledge of how the impact of impairments may be estimated along a path, a framework exists for impairment-aware path computation and establishment utilizing GMPLS protocols and the PCE architecture.

Some transparent optical sub-networks are designed such that over any path the degradation to an optical signal due to impairments never exceeds prescribed bounds. This may be due to the limited geographic extent of the network, the network topology, and/or the quality of the fiber and devices employed. In such network, the path selection problem reduces to determining a continuous wavelength from source to destination (the Routing and Wavelength Assignment problem). In other optical networks, impairments are important and the path selection process must be impairment-aware.

Disclosed herein are processes for routing and wavelength assignment (RWA) used when wavelength continuity constraints are present. These processes are reviewed for optical impairment aware RWA (IA-RWA). Based on selected process models, PCEP requirements are specified to support IA-RWA.

In accordance with at least some embodiments, three alternative process architectures are given for performing routing and wavelength assignment (RWA). The process architectures are referred to herein as "combined RWA," "separated RWA," and "distributed RWA." These alternative process architectures have the following properties and impact PCEP requirements in different ways. For combined RWA, path selection and wavelength assignment are performed as a single process. The requirements for PCC-PCE interaction with such a combined RWA process PCE is addressed herein. For separated RWA, the routing process furnishes one or more potential paths to the wavelength assignment process that then performs final path selection and wavelength assignment. The requirements for PCE-PCE interaction with one PCE implementing the routing process and another implementing the wavelength assignment process is not addressed herein. For distributed RWA, a standard path computation (unaware of detailed wavelength availability) takes place, and then wavelength assignment is performed along this path in a distributed manner via signaling (e.g. resource reservation protocol traffic engineering (RSVP-TE)). This alternative should be covered by existing or emerging GMPLS PCEP extensions and does not present new WSON specific requirements.

In accordance with at least some embodiments, impairments in RWA architectures are addressed by adding an IV process. Such RWA architectures with IV are referred to herein as impairment-aware (IA)-RWAs. More specifically, three alternative architectures of RWAs with an IV process are referred to herein as "combined IA-RWA," "separated IA-RWA," and "distributed IA-RWA" architectures. These alternative IA-RWAs have the following properties and impact on PCEP requirements. For combined IA-RWA, the processes of impairment validation, routing, and wavelength assignment are aggregated into a single PCE. The requirements for PCC-PCE interaction with the combined IA-RWA architecture are addressed herein. For separated IA-RWA, the impairment validation process may be separated from the RWA process to deal with impairment sharing constraints. For example, one PCE may compute impairment candidates and another PCE uses this information while performing RWA. The requirements for PCE-to-PCE interaction with the separated IA-RWA architecture are addressed herein. In distributed IA-RWA, a standard path computation (unaware of detailed wavelength availability or optical impairments) takes place. Then, wavelength assignment and impairment validation is performed along this path in a distributed manner via signaling (e.g. RSVP-TE). PCEP requirements for the distributed IA-RWA architecture may be covered by existing or emerging GMPLS PCEP extensions and does not present new WSON specific requirements.

The RWA and IA-RWA architectures described herein may be reduced to two PCE-based implementations. In a first PCE-based implementation, the processes of routing, wavelength assignment and impairment validation are accessed via a single PCE. In this first PCE-based implementation, the details of the interactions of the processes are not subject to standardization, but the PCC to PCE communications are subject to standardization. In a second PCE-based implementation, the impairment validation process is implemented in a separate PCE. In this second PCE-based implementation, the RWA-PCE acts as a coordinator and the PCC to RWA-PCE interface will be the same as for the first PCE-based implementation. However, in the second PCE-based implementation, there are additional requirements for the RWA-PCE to IV-PCE interface.

Several new PCEP operations for RWA architectures are possible. For example, an RWA-PCC to PCE interface may perform several operations including a new RWA path request/reply, an RWA path re-optimization request/reply, and a combined primary and backup RWA request. For the new RWA path request, the Path Computation Request (PCReq) Message includes the path computation type (e.g., RWA or only routing). This requirement is needed to differentiate between routing with the distribute wavelength assignment option and combined RWA. Further, the PCReq Message may include optical signal quality parameters to which all feasible paths should conform. Examples of the optical signal quality parameters include, but are not limited to, the BER limit, the Q factor, optical signal to noise ratio (OSNR)+Margin, and polarization mode dispersion (PMD). As used herein, "margin" corresponds to an "insurance" (e.g. 3-6 decibels (dB)) for suppliers and operators against unpredictable degradation and unestimatable degradation due to fiber nonlinearity and mismatched wavelength along the path. If the PCReq Message does not include the BER limit and no default BER limit is provisioned at the PCE, then the PCE will return an error specifying that a BER limit must be provided.

Further, the PCReq Message for a new RWA path request includes the route, wavelengths assigned to the route, and an indicator regarding whether the path conforms to an optical quality threshold or not. In the case where a valid path is not found, the Path Computation Reply (PCRep) Message includes information regarding why the path is not found (e.g., no route, wavelength not found, BER failure, etc.)

For the RWA path re-optimization request, the PCReq Message provides the path to be re-optimized and include the following options: (1) re-optimize the path keeping the same wavelength(s); (2) re-optimize wavelength(s) keeping the same path; and (3) re-optimize allowing both wavelength and the path to change. The corresponding PCRep Message for the re-optimized request provides the re-optimized path and wavelengths. If a BER limit is provided in the original new RWA path request then a BER limit is furnished in the re-optimization request. Otherwise, furnishing a BER limit is optional. In the case where the path is not found, the PCRep Message includes information regarding why the path is not found (e.g., no route, wavelength not found, both route and wavelength not found, etc.).

For the combined primary and backup RWA request, the PCReq Message includes the wavelength usage options: (1) the same wavelength is required for the primary and backup paths; and (2) different wavelengths for primary and backup paths are permitted. For at least some PCE operations, any PCReq Message that is associated with a request for wavelength assignment also specifies restrictions on the wavelengths to be used. However, the requestor (PCC) is not required to furnish any range restrictions. Such restrictions may be interpreted by the PCE as a constraint on the tuning ability of the origination laser transmitter.

For a RWA-PCE to IV-PCE interface, various new PCEP considerations for the interface between the RWA-Coord-PCE and the IV-Candidates-PCE are specified herein. For such an interface, the PCReq Message from the RWA-Coord-PCE to the IV-PCE includes an indicator that more than one (candidate) path between source and destination is desired. Further, the PCReq message from the RWA-Coord-PCE to the IV-Candidates-PCE includes a limit on the number of optical impairment qualified paths to be returned by the IV-PCE. Further, the PCReq message from the RWA-Coord- PCE to the IV-Candidates-PCE may include wavelength constraints. Note that optical impairments are wavelength sensitive and hence specifying a wavelength constraint may help limit the search for valid paths. In addition, the PCRep Message from the IV-Candidates-PCE to RWA-Coord-PCE includes a set of optical impairment qualified paths along with any wavelength constraints on those paths. The PCRep Message from the IV-Candidates-PCE to RWA-Coord-PCE also indicates "no path found" in the case where a valid path is not found. The PCReq Message from the RWA-PCE to the IV-PCE may include one or more specified paths and wavelengths that are to be verified by the IV-PCE. This option is applicable, for example, when the IV-PCE is allowed to verify specific paths. Note that once the combined RWA Process PCE receives the resulting paths from the IV Candidates' PCE, the Combined RWA PCE computes RWA for the IV qualified candidate paths and sends the result back to the PCC.

In accordance with at least some embodiments, manageability considerations for WSON Routing and Wavelength Assignment (RWA) with PCE address the following issues: (1) control of function and policy; (2) information and data models (e.g., management information base (MIB) module); (3) liveness detection and monitoring; (4) verifying correct operation; (5) requirements on other protocols and functional components; (6) impact on network operation.

With regard to issue one (control of function and policy), the PCEP implementation disclosed herein should allow configuring PCEP session parameters on PCC including the ability to send a WSON RWA request. Further, the PCEP implementation should allow configuring PCEP session parameters on a PCE including support for WSON RWA and the maximum number of synchronized path requests associated with a WSON RWA per request message. Further, the PCEP implementation provides a set of WSON RWA specific policy parameters (e.g., authorized sender, request rate limiter, etc). Such parameters may be configured as default parameters for any PCEP session the PCEP speaker participates in, or may apply to a specific session with a given PCEP peer or a specific group of sessions with a specific group of PCEP peers.

With regard to issue two (information and data models), the PCEP implementation disclosed herein defines extensions to the PCEP MIB module to cover new PCEP operations and parameters. With regard to issue three (liveness detection and monitoring), the PCEP implementation disclosed herein does not imply any new liveness detection and monitoring requirements compared to previous PCEP implementations. With regard to issue four (verifying correct operation), the PCEP implementation disclosed herein does not imply any new verification requirements compared to previous PCEP implementations. With regard to issue five (requirements on other protocols and functional components), the PCEP implementation disclosed herein may be used with existing PCE discovery mechanisms to advertise WSON RWA path computation capabilities to PCCs. With regard to issue six (impact on network operation), the PCEP implementation disclosed herein does not imply any new network operation requirements compared to previous PCEP implementations.

FIG. 1 illustrates one embodiment of a WSON system 100. In accordance with embodiments, the WSON system 100 is supported by the application-specific requirements for PCEP as described herein. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any quantity of NEs 112.

The WSON 110 may be any optical network that uses active or passive components to transport optical signals. The WSON 110 may implement WDM to transport the optical signals through the WSON 110, and may comprise various optical components as described in detail below. The WSON 110 may be part of a long haul network, a metropolitan network, or a residential access network.

The NEs 112 may be any devices or components that transport signals through the WSON 110. In an embodiment, the NEs 112 consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters as such may reduce the cost and complexity of the WSON 110. In specific embodiments, the NEs 112 may comprise optical cross connects (OXCs), photonic cross connects (PXCs), optical add/drop multiplexers (OADMs), type I or type II reconfigurable optical add/drop multiplexers (ROADMs), wavelength selective switches (WSSs), fixed optical add/drop multiplexers (FOADMs), or combinations thereof.

The NEs 112 may be coupled to each other via optical fibers. The optical fibers may be used to establish optical links and transport the optical signals between the NEs 112. The optical fibers may comprise standard single mode fibers (SMFs) as defined in the International Telecommunication Union (ITU) Telecommunication Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference. The network layer where the NEs 112 operate and communicate may be referred to as the transport plane.

The control plane controller 120 may coordinate activities within the WSON 110. Specifically, the control plane controller 120 may receive optical connection requests and provide lightpath signaling to the WSON 110 via Multiprotocol Label Switching Traffic Engineering (MPLS-TE) or GMPLS, thereby coordinating the NEs 112 such that data signals are routed through the WSON 110 with little or no contention. In addition, the control plane controller 120 may communicate with the PCE 130 using PCEP to provide the PCE 130 with information that may be used for the path computation, and/or receive the path computation from the PCE 130 and forward the path computation to the NEs 112. The control plane controller 120 may be located in a component outside of the WSON 110, such as an external server, or may be located in a component within the WSON 110, such as a NE 112. The network layer where the control plane controller 120 operates may be referred to as the control plane, which may be separated from and may manage the transport plane.

The PCE 130 may perform all or part of the RWA for the WSON system 100, e.g. at the control plane. Specifically, the PCE 130 may receive the wavelength or other information that may be used for the RWA from the control plane controller 120, from the NEs 112, or both. The PCE 130 may process the information to obtain the RWA, for example by computing the routes or lightpaths for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the PCE 130 may receive a path computation request from a PCC. The PCC may be any client application requesting a path computation to be performed by the PCE 130. The PCC may also be any network component that makes such a request, such as the control plane controller 120, or any NE 112, such as a ROADM or a FOADM. Generally, the PCC communicates with the PCE 130 using PCEP, although other acceptable communications protocol may be used as well.

There may be many types of path computation constraints that can affect the path computation at the PCE 130. The patch computation constraints may be included in the path computation request by the PCC. In one embodiment, the path computation constraints include optical quality constraints. Examples of such include the optical signal-to-noise ratio (OSNR), amplifier spontaneous emission (ASE), polarization mode dispersion (PMD), polarization-dependent loss (PDL), coherent optical crosstalk, incoherent optical crosstalk, effective pass-band, gain non-uniformity, gain transients, chromatic dispersion, or combinations thereof. In some embodiments, the path computation constraints may be classified as linear in that their effects are independent of the optical signal power and they affect the wavelengths individually. Alternatively, the path computation constraints may be classified as nonlinear in that their effects are dependent of the optical signal power, generate dispersion on a plurality of wavelength channels, induce crosstalk between wavelength channels, or combinations thereof. Regardless, the path computation constraints may be communicated to the PCE 130 so that the PCE 130 may consider them when computing a signal's path through the WSON 100.

The path computation information used in the WSON system 100 may also comprise impairment information, which may be used to perform IA-RWA in the WSON 110. For instance, the PCE 130 may perform all or part of IV for the WSON system 100, which may comprise validating a computed path based on any impairment in the path that may degrade a propagated optical signal. When optical impairments accumulate along a path propagated by an optical signal, the impairments may degrade the signal, which may decrease a bit error rate (BER) of the signal or even lead to failure in detecting or demodulating the signal. The path may be validated if the BER of the signal (or any other measure of signal quality) due to optical impairments may be acceptable or tolerated and the signal may be detected with sufficient accuracy. However, if the BER of the signal is substantially low due to optical impairments, the path may be rejected or excluded from the allowed paths.

The optical impairments may be influenced by physical processes or conditions of the network components, such as the type of fiber, the types and locations of NEs 112, the presence of other optical signals that may share a fiber segment along the signal's path, or combinations thereof. The optical impairments and the physical processes that may cause such impairments are described in a plurality of optical communications references, such as the Internet Engineering Task Force (IETF) Request for Comments (RFC) 4054, which is incorporated herein by reference as if reproduced in its entirety. Optical impairments are also described by Govind P. Agrawal in "Fiber-Optic Communications Systems," published by Wiley-Interscience, 2002, and in "Nonlinear Fiber Optics," published by Academic Press, 2007, both of which are incorporated herein by reference.

Optical impairments may be ignored in some networks, where every path may be valid for the permitted signal types in the network. In this case, optical impairments may be considered during network design and then ignored afterwards, e.g. during path computation. However, in other networks, e.g. larger networks, it may not be practical to limit the allowed paths for each signal type. Instead, IV may be performed for a plurality of paths using approximation techniques, such as link budgets and dispersion (rise time) budgets, e.g. during path computation. Approximation techniques for IV are described in a plurality of optical references, including ITU-T G.680 and ITU-T series G supplement 39 (G.Sup39), both of which are incorporated herein by reference. The approximation techniques for IV may be based on impairment models and may be used to approximate or estimate impairments due to network components (such as NEs), e.g. at the control plane level. For instance, approximated IV may comprise determining which paths may have an acceptable BER or OSNR for a signal type. In some cases, IA-RWA may be improved in the network by combining approximated IV with RWA, e.g. at a PCE, as described below.

In some cases, impairment effects may require accurate estimation, such as for the evaluation of impairment impact on existing paths prior to the addition of a new path. A plurality of methods may be used for accurate or detailed IV, such as methods based on solving a plurality of partial differential equations that describe signal propagation in a fiber. The methods may also comprise using detailed models for the network components. The estimation/simulation time of such methods may depend on the situation or condition in the network. A significant amount of time may be needed to validate or qualify a path using detailed IV. To increase the probability of validating a path, approximated IV may be performed before the detailed IV. Since detailed IV may be based on estimation/simulation methods that may be substantially different than the RWA methods, the detailed IV process may be separated from the RWA process, e.g. using a separate IV entity or a separate PCE.

Some path computation information, such as RWA information, may be shared without restrictions or constraints between the path computation entities, e.g. between a PCE and a PCC or between PCEs. However, in some cases, the impairment information may be private information and may not be shared between different vendors of different components in the network. For instance, the impairment information may not be shared if some proprietary impairment models are used to validate paths or a vendor chooses not to share impairment information for a set of NEs. For example, in a network that comprises a line segment that corresponds to a first vendor and traverses through a plurality of NEs (e.g. OADMs, PXCs, etc.) that correspond to a plurality of second vendors, the impairment information for the line segment may be private and may not be shared with the second vendors. However, the impairment information for the second vendors may be public and may be shared with the first vendor.

In an embodiment, to maintain impairment information of a first vendor equipment private, the first vendor equipment may provide a list of potential paths to a first PCE in the network, which may consider the list for path computation between an ingress node and an egress node. The list of paths may also comprise wavelength constraints and possibly shared impairment information, e.g. for the first vendor and at least a second vendor. The list may then be sent to a second PCE in the network to perform IA-RWA. However, in relatively larger networks, the list of paths may be substantially large, which may cause scaling issues. In another embodiment, the first vendor equipment may comprise a PCE-like entity that provides the list of paths to a PCE in the network in charge of IA-RWA. The PCE-like entity may not perform RWA and therefore may not require knowledge of wavelength availability information. This approach may reduce the scaling issues due to forwarding substantially large lists. In another embodiment, the first vendor equipment may comprise a PCE, which may be configured to perform IA-RWA, e.g. on behalf of the network. This approach may be more difficult to implement than the other approaches but may reduce the amount of information exchanged and the quantity of path computation entities involved.

Further, a plurality of IV schemes may be used for IA-RWA, e.g. based on different detail levels and/or different architectures. For instance, the IA-RWA process may comprise IV for candidate paths, where a set of paths (e.g. between two nodes) may be validated in terms of acceptable optical impairment effects. Thus, the validated paths may be provided with associated wavelength constraints. The paths and the associated wavelengths may or may not be available in the network when provided, e.g. according to the current usage state in the network. The set of paths may be provided in response to a received request for at most K (where K is an integer) valid paths between two nodes. The set of paths may be provided without disclosing private impairment information about a vendor's equipment. Additionally or alternatively, the IA-RWA process may comprise detailed IV (IV-Detailed), where a validation request for a path and an associated wavelength may be submitted. The path and the associated wavelength may then be validated and accordingly a response may be provided. Similar to the case of IV for candidate paths, the IV response may not disclose impairment information about the vendor's equipment.

Alternatively, the IA-RWA process may comprise distributed IV, where approximated impairment degradation measures may be used, such as OSNR, differential group delay (DGD), etc. The approximated measures may be carried through and accumulated along a path, e.g. using GMPLS or other signaling protocol. When the accumulated measures reach a destination node, a final decision may be made about the path validity. This approach may require disclosing impairment information about a vendor's equipment, e.g. along the path.

Figure 2:
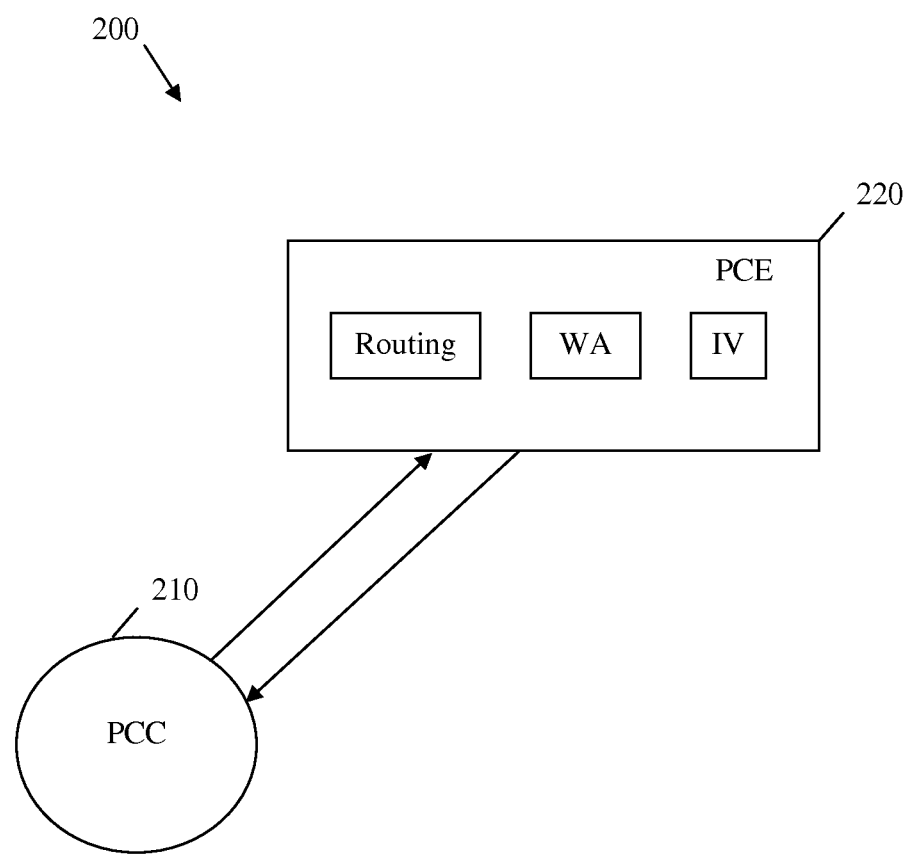
FIG. 2 is a schematic diagram of an embodiment of a combined impairment aware RWA architecture.

A plurality of IA-RWA architectures may be used in optical networks, e.g. WSONs, to perform routing, WA, and W. FIG. 2 illustrates an embodiment of a combined IA-RWA architecture 200. For the combined IA-RWA architecture 200, path selection and wavelength assignment are based at least in part on new PCEP requirements such as the new RWA path requests, the RWA path re-optimization requests and/or the combined primary and backup RWA requests described herein.

In the combined IA-RWA architecture 200, a PCC 210 may send a path computation request, which may comprise path computation information, to a PCE 220. The path computation request may comprise RWA information and the PCE 220 may have previous knowledge of shared impairment information, e.g. for a plurality of vendors' equipment. However, the PCE 220 may request additional impairment information, such as non-shared impairment information for any additional vendor's equipment. The PCE 220 may then perform combined routing, WA, and IV using the RWA information and the impairment information. The PCE 220 may use a single computation entity, such as a processor, to perform the combined IA-RWA. For example, the processor may process the RWA information and the impairment information using a single or multiple algorithms to compute the lightpaths, to assign the optical wavelengths for each lightpath, and to validate the lightpaths. Alternatively, the PCE 220 may use a plurality of processors to compute and validate the lightpaths and assign the wavelengths.

During the IA-RWA process, the PCE 220 may perform approximated IV or detailed IV to validate the lightpaths, as described above. Further, the PCE 220 may perform IV before RWA. As such, the PCE 220 may generate first a list of candidate and valid paths in terms of acceptable impairment effects, and then perform RWA to provide computed paths based on the list. Alternatively, the PCE 220 may perform RWA before IV, where a list of computed paths may be first obtained and where then each path may be validated based on impairment information.

The amount of RWA information and impairment information needed by the PCE 220 to compute the paths may vary depending on the algorithm used. If desired, the PCE 220 may not compute the paths until sufficient network links are established between the NEs or when sufficient RWA information and impairment information about the NEs and the network topology is provided. The PCE 220 may then send the computed paths, and the wavelengths assigned to the paths, to the PCC 210. The PCE response may not disclose impairment information about a vendor's equipment. The combined IA-RWA architecture 200 may improve the efficiency of IA-RWA, and may be preferable for network optimization, smaller WSONs, or both.

Figure 3:
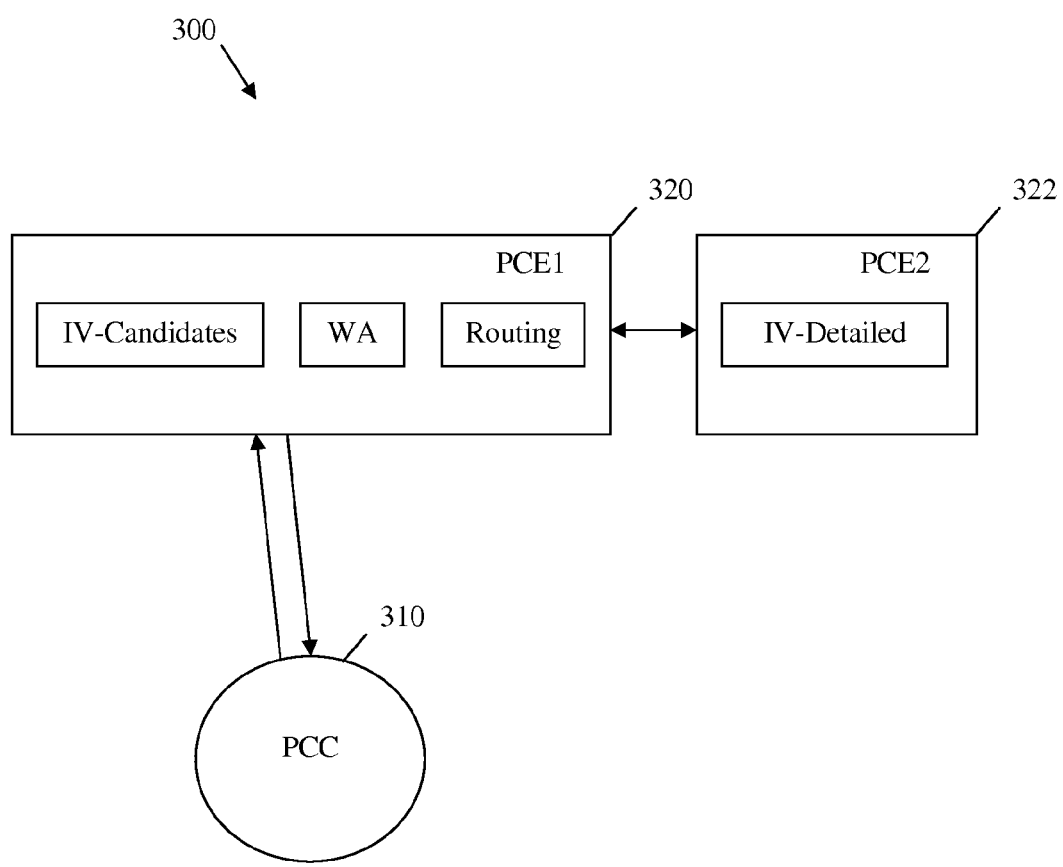
FIG. 3 is a schematic diagram of another embodiment of a combined impairment aware RWA architecture.

FIG. 3 illustrates an embodiment of another combined IA-RWA architecture 300. For the combined IA-RWA architecture 300, path selection and wavelength assignment are based at least in part on new PCEP requirements such as the new RWA path requests, the RWA path re-optimization requests and/or the combined primary and backup RWA requests described herein.

In the combined IA-RWA architecture 300, a PCC 310 may send a path computation request to a first PCE 320. The first PCE 320 may be configured to perform routing, WA, and IV for candidate paths (IV-Candidates). The first PCE 320 may use the RWA information in the path computation request to perform a combined IA-RWA. The first PCE 320 may have previous knowledge of shared impairment information for a plurality of vendors' equipment but may request additional impairment information, such as non-shared impairment information for any additional vendor's equipment. The impairment information may comprise a set of K paths, e.g. between a source node and a destination node, and a plurality of wavelengths associated with the paths. The first PCE 320 may generate a set of validated paths based on the impairment information, e.g. using IV approximation techniques. The first PCE 320 may perform RWA based on the generated set of validated paths. The first PCE 320 may then send a list of computed and validated paths and assigned wavelengths to a second PCE (or IV entity), which may be configured to perform detailed IV (IV-Detailed).

The second PCE 322 may have previous knowledge of impairment information that may not be shared with the first PCE 320 and may use the impairment information to validate the paths. Additionally, the second PCE 322 may request additional impairment information, such as non-shared impairment information for any additional vendor's equipment. Thus, the second PCE 322 may validate each computed path and return a final list of validated paths to the first PCE 320, which may then forward the list to the PCC 310. The final list of validated paths may not comprise the private impairment information.

In an alternative embodiment, the first PCE 320 may communicate with the second PCE 322 as many times as needed to check the validity of each computed path. For instance, the first PCE 320 may send a validation request for each computed path to the second PCE 322, and the second PCE 322 may return a positive or negative response for each request to the first PCE 320, based on the outcome of a detailed IV process. As such, the first PCE 320 may not obtain any private impairment information in the response from the second PCE 322.

The combined IA-RWA architecture 300 may be used in the case where the first PCE 320, the second PCE 322, or both may access private impairment information about a vendor's equipment but may not share it. Further, separating the IV process into an initial approximated IV and a subsequent detailed-IV between the first PCE 320 and the second PCE 322 may improve the efficiency and precision of IA-RWA.

Figure 4:
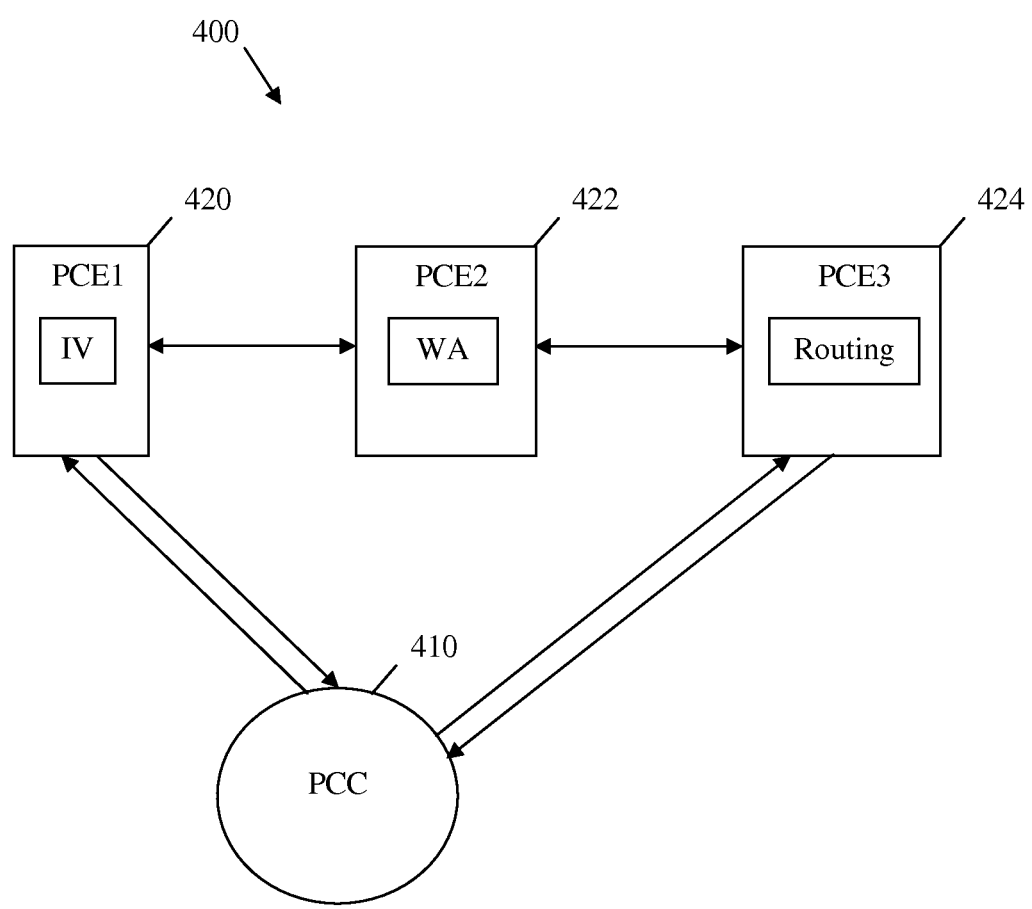
FIG. 4 is a schematic diagram of an embodiment of a separated impairment aware RWA architecture.

FIG. 4 illustrates an embodiment of a separated IA-RWA architecture 400. For the separated IA-RWA architecture 400, various new PCEP considerations for the interface between the RWA-Coord-PCE (PCE2 422 and PCE3 424) and the IV-PCE (PCE1 420) are specified. In at least some embodiments, the PCReq Message from the RWA-Coord-PCE (PCE2 422 and PCE3 424) to the IV-PCE (PCE1 420) includes an indicator that more than one (candidate) path between source and destination is desired. Further, the PCReq message from the RWA-Coord-PCE (PCE2 422 and PCE3 424) to the IV-Candidates-PCE (PCE1 420) includes a limit on the number of optical impairment qualified paths to be returned by the IV-PCE (PCE1 420). Further, the PCReq message from the RWA-Coord-PCE (PCE2 422 and PCE3 424) to the IV-Candidates-PCE (PCE1 420) may include wavelength constraints. Note that optical impairments are wavelength sensitive and hence specifying a wavelength constraint may help limit the search for valid paths. Further, the PCRep Message from the IV-Candidates-PCE (PCE1 420) to RWA-Coord-PCE includes a set of optical impairment qualified paths along with any wavelength constraints on those paths. Further, the PCRep Message from the IV-Candidates-PCE (PCE2 422 and PCE3 424) to RWA-Coord-PCE (PCE1 420) indicates "no path found" in the case where a valid path is not found. Note that once the combined RWA Process PCE (PCE2 422 and PCE3 424) receives the resulting paths from the IV Candidates' PCE (PCE1 420), the combined RWA PCE (PCE2 422 and PCE3 424) computes RWA for the IV qualified candidate paths and sends the result back to the PCC 410.

In the separated IA-RWA architecture 400, a PCC 410 may send a path computation request to a first PCE (or IV entity) 420, which may be configured to perform IV using approximate or detailed techniques/models. The first PCE 420 may have previous knowledge of shared impairment information for a plurality of vendors' equipment but may obtain additional impairment information, such as non-shared impairment information for any additional vendor's equipment. The first PCE 420 may use the impairment information and possibly a set of available wavelengths in the path computation request to generate a list of validated paths. For instance, the impairment information may comprise a set of about K paths, e.g. between a source node and a destination node, and a plurality of wavelengths associated with the paths. The first PCE 420 may generate a set of validated paths based on the impairment information. The first PCE 420 may send the list of paths and the associated wavelengths to the second PCE 422, e.g. without sharing the impairment information with the second PCE 422 or any other PCE.

The second PCE 422 may be configured to assign wavelengths to the paths provided by the first PCE 420 and may then send the list of paths to a third PCE 424, which may be configured for routing assignments. The third PCE 424 may receive the path computation information from the PCC 410 and perform path computation using the information from the PCC 410 and the information from the first PCE 420 and second PCE 422 to obtain a plurality of computed and validated paths and corresponding wavelengths. The third PCE 424 may then send the computed paths and assigned wavelengths to the PCC 410.

In an alternative embodiment, the third PCE 424 may receive the path computation request from the PCC 410 and generate a list of computed paths and corresponding wavelengths, which may be sent to the second PCE 422. The second PCE 422 may assign wavelengths to the paths and communicate the list of paths and wavelengths to the first PCE 420 to validate each path. For instance, the first PCE 420 may send a positive or negative response for each computed path, e.g. without sharing private impairment information. Finally, the validated paths and associated wavelengths may be sent to the PCC 410, via any of the PCEs.

Figure 5:
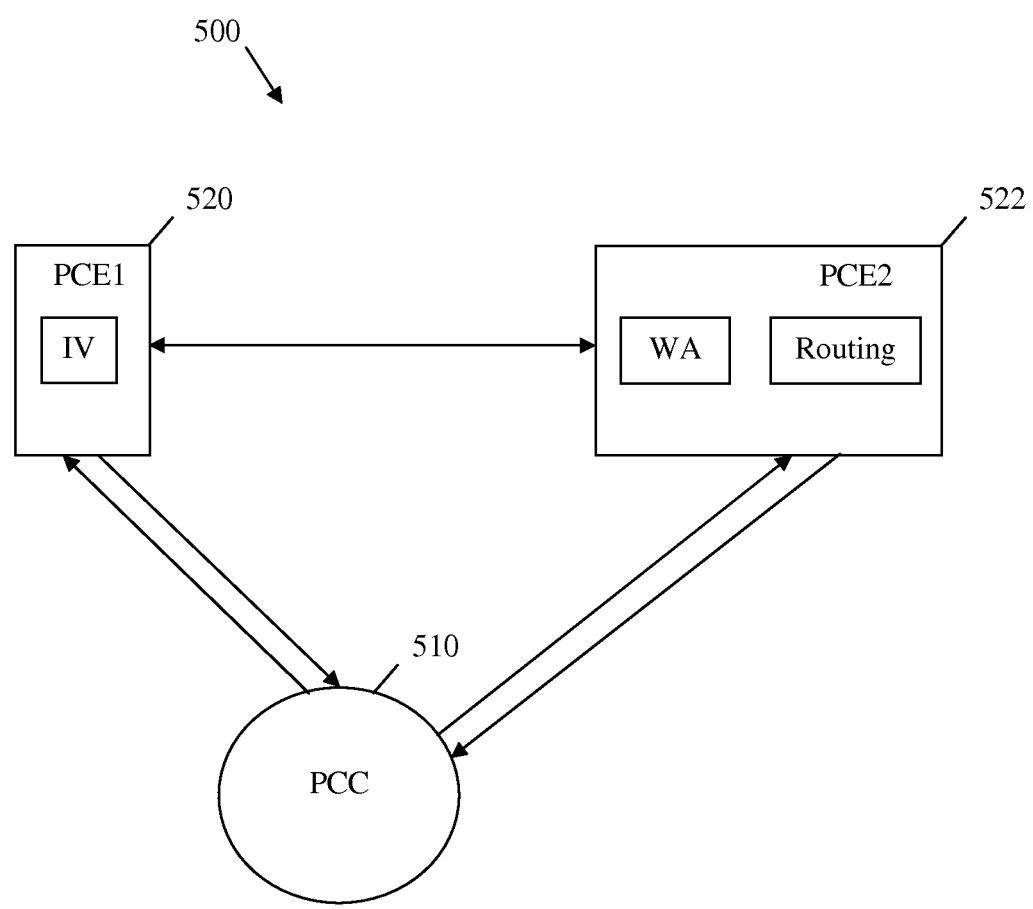
FIG. 5 is a schematic diagram of another embodiment of a separated impairment aware RWA architecture.

FIG. 5 illustrates an embodiment of another separated IA-RWA architecture 500. For the separated IA-RWA architecture 500, new PCEP considerations for the interface between the RWA-Coord-PCE (PCE2 522) and the IV-PCE (PCE1 520) are specified. In at least some embodiments, the PCReq Message information described herein (e.g., for the separated IA-RWA architecture 400) is passed between the RWA-Coord-PCE (PCE2 522) and the IV-PCE (PCE1 520) of the separated IA-RWA architecture 500.

In the separated IA-RWA architecture 500, a PCC 510 may send a path computation request to a first PCE (or IV entity) 520, which may be configured to perform IV using approximate or detailed techniques/models and send a list of validated paths and corresponding wavelengths to a second PCE 522, e.g. in a manner similar to the separated IA-RWA architecture 400. However, the second PCE 522 may be configured to perform combined RWA, e.g. using a shared processor or dedicated processors. Thus, the second PCE 522 may receive the path computation information from the PCC 510 and perform path computation using the information from the PCC 510 and the information from the first PCE 520 to obtain a plurality of computed and validated paths and corresponding wavelengths. The second PCE 522 may then send the computed paths and assigned wavelengths to the PCC 510. Separating the IV process and the RWA process between the first PCE 520 and the second PCE 522 may be advantageous since the two different processes may be offloaded as such to two separate and specialized processing entities, which may improve computation efficiency.

In an alternative embodiment, the second PCE 522 may receive the path computation request from the PCC 510 and generate a list of computed paths and corresponding wavelengths. The second PCE 522 may then communicate the list of paths and wavelengths to the first PCE 520 to validate each path. For instance, the first PCE 520 may send a positive or negative response for each computed path, e.g. without sharing private impairment information. Finally, the validated paths and associated wavelengths may be sent to the PCC 510, via any of the PCEs.

Figure 6:
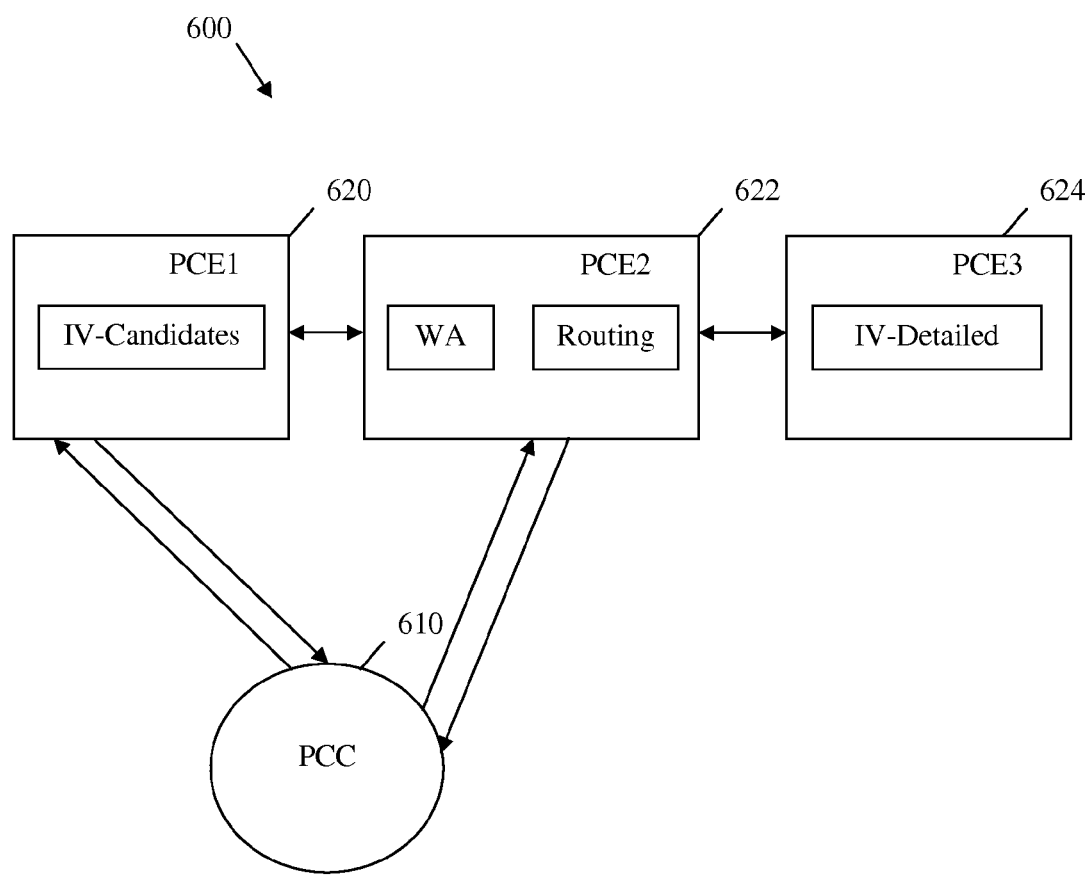
FIG. 6 is a schematic diagram of another embodiment of a separated impairment aware RWA architecture.

FIG. 6 illustrates an embodiment of another separated IA-RWA architecture 600. For the separated IA-RWA architecture 600, various new PCEP considerations for the interface between the RWA-Coord-PCE (PCE2 622) and the IV-PCE (PCE1 620) are specified. In at least some embodiments, the PCReq Message information described herein (e.g., for the separated IA-RWA architecture 400) is passed between RWA-Coord-PCE (PCE2 622) and the IV-PCE (PCE1 620) of the separated IA-RWA architecture 600.

In the separated IA-RWA architecture 600, a PCC 610 may send a path computation request to a first PCE (or IV entity) 620, which may be configured to perform IV for candidate paths. The first PCE 620 may have previous knowledge of shared impairment information for a plurality of vendors' equipment but may request additional impairment information, such as non-shared impairment information for any additional vendor's equipment. The first PCE 620 may use the impairment information and possibly a set of available wavelengths in the path computation request to generate a list of validated paths. For instance, the impairment information may comprise a set of about K paths, e.g. between a source node and a destination node, and a plurality of wavelengths associated with the paths. The first PCE 620 may generate a set of validated paths based on the impairment information, e.g. using IV approximation techniques. The first PCE 620 may send the list of paths and the associated wavelengths to the second PCE 622. However, the first PCE 620 may not share the impairment information with the second PCE 622.

The second PCE 622 may be configured to perform combined RWA, e.g. using a shared processor or dedicated processors. The second PCE 622 may receive the path computation information from the PCC 610 and perform path computation using this information and the information from the first PCE 620 to obtain a plurality of computed and validated paths and corresponding wavelengths. The second PCE 622 may then send a list of computed and validated paths and assigned wavelengths to a third PCE (or IV entity) 624, which may be configured to perform detailed IV.

The third PCE 624 may have previous knowledge of impairment information that may not be shared with the second PCE 622 and may use the impairment information to validate the paths. Additionally, the third PCE 624 may request additional impairment information, such as non-shared impairment information for any additional vendor's equipment. Thus, the third PCE 624 may validate each computed path and return a final list of validated paths to the second PCE 622. The second PCE 622 or the first PCE 620 may then forward the final list to the PCC 610. The final list of validated paths may not comprise the private impairment information.

In an alternative embodiment, the second PCE 622 may communicate with the third PCE 624 as many times as needed to check the validity of each computed path. For instance, the second PCE 622 may send a validation request for each computed path to the third PCE 624, and the third PCE 624 may return a positive or negative response to the second PCE 622, based on the outcome of a detailed IV process. As such, the second PCE 622 may not obtain any private impairment information in the response from the third PCE 624.

The combined IA-RWA architecture 600 may be used in the case where the first PCE 620 and/or the third PCE 624, but not the second PCE 622, may access private impairment information about a vendor's equipment but may not share it. Further, separating the IV process into an initial approximated IV and a subsequent detailed IV between the first PCE 620 and the third PCE 624 may improve the efficiency and precision of IA-RWA.

Figure 7:
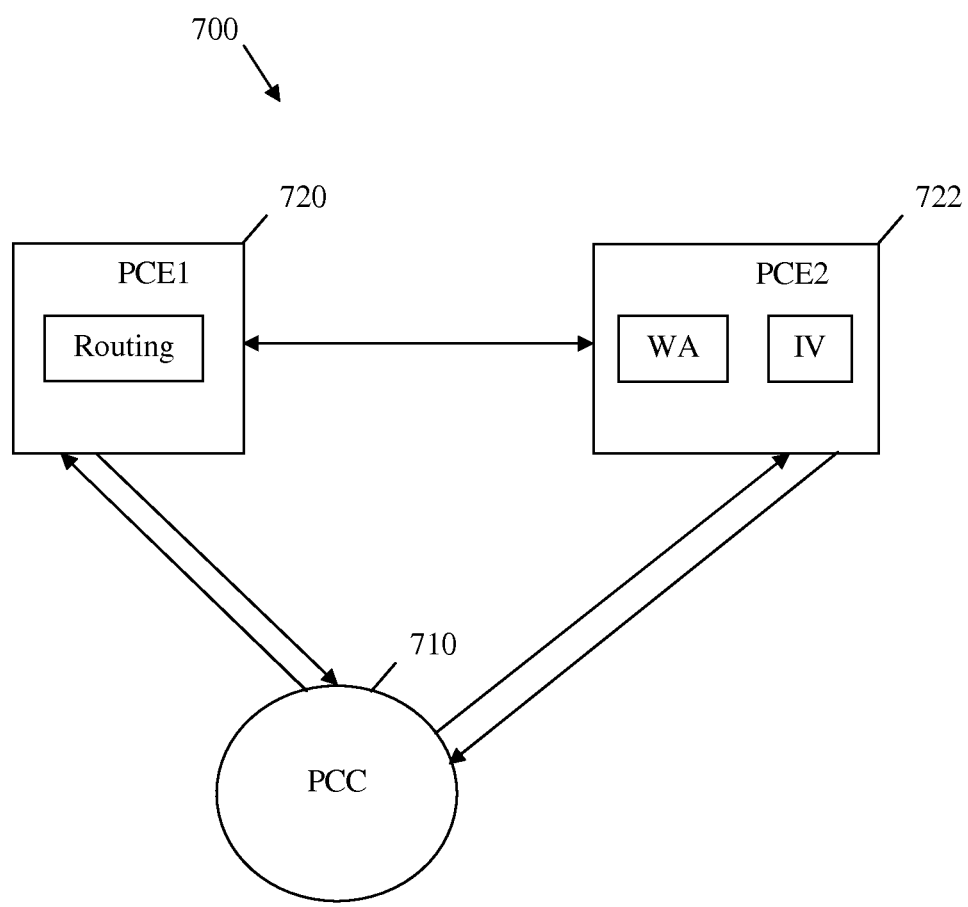
FIG. 7 is a schematic diagram of another embodiment of a separated impairment aware RWA architecture.

FIG. 7 illustrates an embodiment of another separated IA-RWA architecture 700. For the separated IA-RWA architecture 700, various new PCEP considerations for the interface between the RWA-Coord-PCE (PCE2 722) and the IV-PCE (PCE1 720) are specified. In at least some embodiments, the PCReq Message information described herein (e.g., for the separated IA-RWA architecture 400) is passed between RWA-Coord-PCE (PCE2 722) and the IV-PCE (PCE1 720) of the separated IA-RWA architecture 700.

In the separated IA-RWA architecture 700, a PCC 710 may send a path computation request to a first PCE 720, which may be configured for routing assignments. The first PCE 720 may perform path computation using path computation information from the PCC 710 and then send the computed paths and any RWA information in the path computation request to the second PCE 722, which may be configured for combined WA and W.

The second PCE 722 may receive the computed paths and RWA information from the first PCE 720 and may have previous knowledge of shared impairment information, e.g. for a plurality of vendors' equipment. The second PCE 722 may also request additional impairment information, such as non-shared impairment information for any additional vendor's equipment. Thus, the second PCE 722 may perform combined WA and IV using the RWA information and the impairment information. The second PCE 722 may use a single, or a plurality of, processors to perform the combined WA and W. The second PCE 722 may perform approximated IV or detailed IV to validate the computed paths. Further, the second PCE 722 may perform IV before WA. As such, the second PCE 722 may generate first a list of candidate and valid paths, e.g. based on the computed paths, and then perform WA. Alternatively, the second PCE 722 may perform WA before IV, where wavelengths may be assigned to the computed paths and then each path may be validated based on impairment information. Since the IV process is wavelength dependent, combining WA and IV in the second PCE 722 may improve the computation efficiency in the system. The final list of computed paths and assigned wavelengths may then be sent to the PCC 710 via the second PCE 722 or the first PCE 720.

In an alternative embodiment, the second PCE 722 may receive the path computation request from the PCC 710 and generate a list of validated paths and assigned wavelengths, which may be sent to the first PCE 720. The first PCE 720 may then compute a plurality of paths and associated wavelengths based on the information from the first PCE 722. Finally, the computed and validated paths and associated wavelengths may be sent to the PCC 710, via any of the PCEs.

Figure 8:
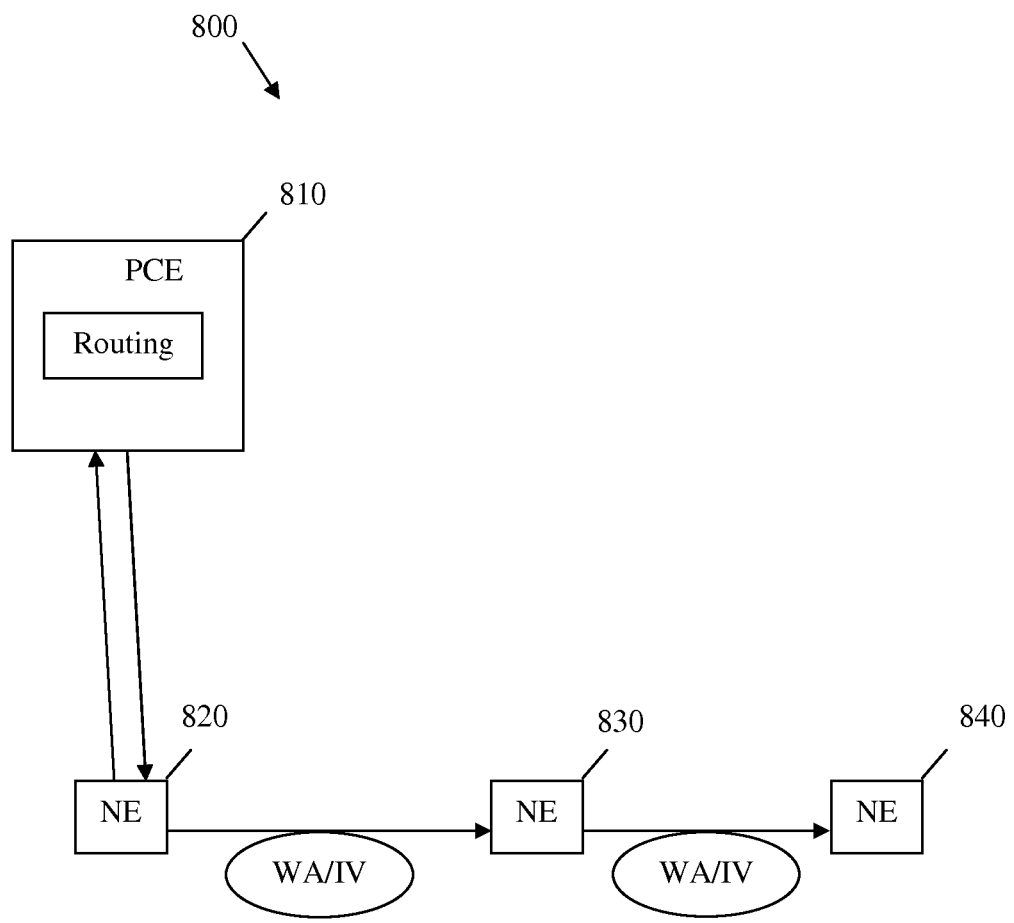
FIG. 8 is a schematic diagram of an embodiment of a distributed impairment aware RWA architecture.

FIG. 8 illustrates an embodiment of a distributed IA-RWA architecture 800. In the distributed IA-RWA architecture 800, a standard path computation (unaware of detailed wavelength availability or optical impairments) takes place. Then, wavelength assignment and impairment validation is performed along this path in a distributed manner via signaling (RSVP-TE). New PCEP extensions for the distributed IA-RWA architecture 800 are not disclosed herein.

In the distributed IA-RWA architecture 800, a PCE 810 may receive some or all of the RWA information from the NEs 820, 830, and 840, perhaps via direct link, and perform the routing assignment. The PCE 810 then directly or indirectly passes the routing assignment to the individual NEs 820, 830, and 840, which may then perform distributed WA and IV (WA/IV) at the local links between the NEs 820, 830, and 840, e.g. based on local information.

For instance, the NE 820 may receive local RWA information from the NEs 830 and 840 and send some or all of the RWA information to the PCE 810. The PCE 810 may compute the lightpaths using the received RWA information and send the list of lightpaths to the NE 820. The NE 820 may use the list of lightpaths to identify the NE 830 as the next NE in the lightpath. The NE 820 may establish a link to the NE 830, e.g. via a signaling protocol, and use the received local RWA information that may comprise additional constraints to assign a wavelength for transmission over the link. Additionally, the NE 820 may use local impairment information to perform IV and generate a list of validated lightpaths. The list of validated paths may correspond to a plurality of wavelengths, which may be specified by the PCE 810 or indicated in the RWA information. The NE 820 may perform approximated IV for at least some of the wavelengths based on approximated models and measures, which may be carried through and accumulated along a path, e.g. using GMPLS or GMPLS resource reservation protocol (RSVP). For example, the NE 820 may perform IV based on a measure of signal quality, e.g. BER or OSNR, which may be accumulated along the path by the subsequent nodes.

The NE 830 may receive the list of lightpaths and the wavelengths from the NE 820, and use the list of lightpaths to identify the NE 840 as the next NE in the lightpath. Hence, the NE 830 may establish a link to the NE 840 and assign the same or a different wavelength for transmission over the link. The NE 830 may also use the same impairment information used by the NE 820 and/or other local impairment information to perform IV and update the list of validated lightpaths and the associated wavelengths. The NE 830 may perform approximated IV based on the same approximated models and measures (e.g. BER, OSNR, etc.), which may be updated and further accumulated by the NE 830. Similarly, the NE 840 may receive the list of lightpaths and wavelengths from the NE 830 and the impairment information, including the accumulated measures, from the NE 840, update the received information, and propagate the information along the path.

Thus, the signals may be routed while the wavelengths are assigned and the lightpaths are validated in a distributed manner between the NEs until a destination node is reached. Assigning the wavelengths at the individual NEs may reduce the amount of RWA information and impairment information that may be forwarded between the NEs and between the NEs and the PCE 810. However, such distributed WA/IV schemes may require sharing some local and private impairment information between the NEs. Further, such signaling based schemes may become less practical as the quantity of computed paths and the available wavelengths increase.

At least some of the IA-RWA architectures described above may require changes in current protocols and/or standards, for example regarding the PCE, signaling, the information model, routing, or combinations thereof. Table 1 illustrates some aspects of the system that may require changes to support the IA-RWA architectures above.

TABLE 1

System aspects that may require changes for different IA-RWA architectures.

| IA-RWA Architecture | PCE | Signaling | Information Model | Routing |
|---|---|---|---|---|
| Combined IA-RWA architectures 200 | Yes | No | Yes | Yes |
| Combined IA-RWA architectures 300 | Yes | No | Yes | Yes |
| Combined IA-RWA architectures 400 | No | No | Yes | Yes |
| Combined IA-RWA architectures 500 | No | No | Yes | Yes |
| Combined IA-RWA architectures 600 | No | No | Yes | Yes |
| Combined IA-RWA architectures 700 | No | No | Yes | Yes |
| Combined IA-RWA architectures 800 | No | Yes | Yes | No |

Some of the impairment models, which may be used in the IA-RWA architectures above, may be described in ITU-T G.680. ITU-T G.680 includes some detailed and approximate impairment characteristics for fibers and various devices and subsystems. ITU-T G.680 also describes an integrated impairment model, which may be used to support IA-RWA, e.g. in the architectures above. However, the impairment characteristics and models in ITU-T G.680 are suitable for a network that comprises a line segment for a first vendor, which passes through a plurality of NEs (e.g. OADMs, PXCs, etc.) for a plurality of second vendors. The impairment information for the line segment may be private and the impairment information for the second vendors may be public. However, additional or different impairment models and impairment characteristics may be required for other network configurations, where a plurality of line segments or systems that correspond to a plurality of vendors may be deployed across the system.

For instance, in the case of a distributed IA-RWA architecture, such as the distributed IA-RWA architecture 800, an impairment information model and an impairment "computation model" may be needed to enable IV. Further, the accumulated impairment measures, which may be propagated and updated at a plurality of nodes along a path, may require standardization so that different nodes for different vendors in the same system may support IV. ITU-T G.680 may describe some impairment measures that may be used, such as computation formulas for OSNR, residual dispersion, polarization mode dispersion/polarization dependent loss, effects of channel uniformity, etc. However, ITU-T G.680 does not specify which measurements may be stored or maintained in the nodes and in what form.

The different IA-RWA architectures above may also use different path/wavelength impairment validation, which may impose different demands on routing. For instance, in the case where approximate impairment information is used to validate the paths, GMPLS routing may be used to distribute the impairment characteristics of the NEs and the links, e.g. based on an impairment information model. In the case of a distributed IA-RWA architecture, no changes to the routing protocol may be necessary, but substantial changes may be needed in the signaling protocol to enable IV. For instance, the characteristics of the transported signal in the distributed scheme, such as the signal modulation type, may affect system tolerance to optical impairments. Therefore, it may be advantageous to communicate such signal characteristics in the distributed scheme, e.g. via signaling.

Further, the different IA-RWA architectures above may comprise different PCE configurations, which may depend on the specific functionalities required for each architecture. For instance, in the case of the combined IA-RWA architecture 200, a single PCE (e.g. PCE 220) may perform all the computations needed for IA-RWA. As such, the PCE may be configured to maintain, e.g. in a TED, information about network (e.g. WSON) topology and switching capabilities, network WDM link wavelength utilization, and network impairment information. The PCE may also be configured to receive a path computation request from a PCC that may comprise a source node, a destination node, and a signal characteristic, type, and/or required quality. If the path computation is successful, the PCE may send a reply (or response) to the PCC that may comprise the computed path(s) and the assigned wavelength(s). Otherwise, if the path computation is not successful, the PCE may send a response to the PCC that indicates the reason that the path computation failed. For example, the response may indicate that the path computation failed due to lack of available wavelengths, due to impairment considerations, or both.

In the case of the separate IA-RWA architectures, such as the separate IA-RWA architecture 500, at least two PCEs (e.g. the PCE 520 and PCE 522) may perform the IV and RWA separately. One of the PCEs (e.g. PCE 522) may be configured to perform RWA computations and coordinate the overall IA-RWA process and the other PCE (e.g. PCE 520) may be configured to perform IV for candidate paths (IV-Candidate). The RWA PCE may interact with a PCC to receive path computation requests and with the IV-Candidates PCE to perform IV as needed and obtain a valid set of paths and wavelengths. The RWA PCE may also be configured to maintain, e.g. in a TED, information about network (e.g. WSON) topology and switching capabilities and about network WDM link wavelength utilization. However, the IV RWA PCE may not maintain impairment information.

The RWA PCE may also be configured to receive a path computation request from a PCC that may comprise a source node, a destination node, and a signal characteristic, type, and/or required quality. If the path computation is successful, the RWA PCE may send a reply (or response) to the PCC that may comprise the computed path(s) and the assigned wavelength(s). Otherwise, if the path computation is not successful, the RWA PCE may send a response to the PCC that indicates the reason that the path computation had failed. For example, the response may indicate that the path computation had failed due to lack of available wavelengths, due to impairment considerations, or both. Additionally, the RWA PCE may be configured to send a request to the IV-Candidates PCE to ask for K paths and acceptable wavelengths for the paths between the source node and the destination node in the PCC request. Accordingly, the RWA PCE may receive a reply (or response) from the IV-Candidates PCE, which may comprise at most K requested paths and associated wavelengths between the two nodes.

The IV-Candidates PCE may be configured for impairment aware path computation without necessarily the knowledge of current link wavelength utilization. The IV-Candidates PCE may interact with the RWA PCE, but not with the PCC, and may maintain, e.g. in a TED, information about network (e.g. WSON) topology and switching capabilities and network impairment information. However, the IV-Candidates PCE may not maintain network WDM link wavelength utilization. The combined IA-RWA architecture 400 is another IA-RWA architecture that may comprise a similarly configured IV-Candidates PCE.

Additionally or alternatively, one of the PCEs may be configured to perform detailed IV (IV-Detailed), such as in the separate IA-RWA architecture 600. The IV-Detailed PCE may maintain, e.g. in a TED, network impairment information and possibly information about WDM link wavelength utilization. To coordinate overall IA-RWA, the RWA PCE may send an IV request to the IV-Detailed PCE, which may comprise a list of paths and wavelengths and any signal characteristics and quality requirements. Thus, the IV-Detailed PCE may send back a reply (response) to the RWA PCE, which indicates whether the IV request was successfully/unsuccessfully met. For example, the reply may indicate a positive/negative decision (e.g. yes/no decision). If the IV request is not met, the IV-Detailed PCE may send a reply to the RWA PCE that indicates the reason that the IV request failed. Consequently, the RWA PCE may determine whether to try a different signal, e.g. by modifying a signal parameter or characteristic. The combined IA-RWA architecture 300 is another IA-RWA architecture that may comprise a similarly configured IV-Detailed PCE.

Figure 9:
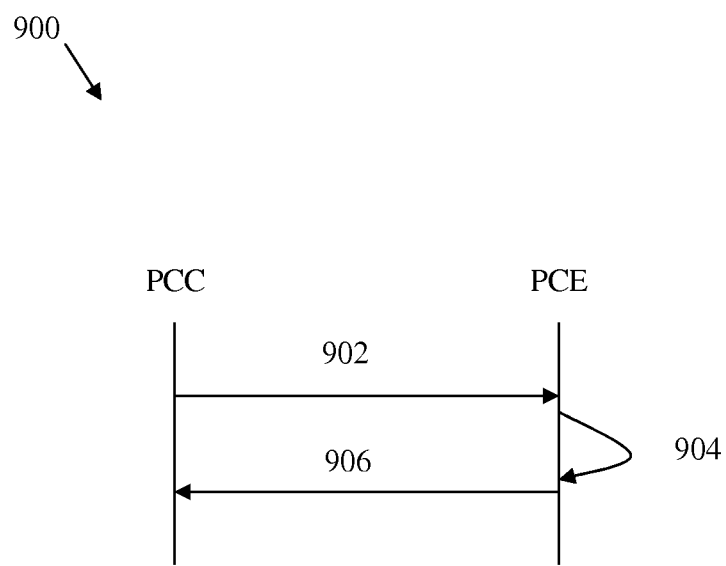
FIG. 9 is a protocol diagram of an embodiment of a path computation communication method.

FIG. 9 illustrates an embodiment of a path computation communication method 900 between a PCC and a PCE. The PCE may be configured for combined IA-RWA, such as in combined IA-RWA architecture 200. The method 900 may be implemented using any suitable protocol including, but not limited to, the new PCEP operations disclosed herein. In the method 900, the PCC may send a path computation request 902 to the PCE. The request may comprise path computation information and path computation constraints. For example, the path computation information may comprise RWA information, including wavelength constraints, and possibly required impairment information. At 904, the PCE calculates a path through the network, which may be based on the path computation information and meet the path computation constraints. For example, the PCE may perform RWA and IV based on the RWA information and the impairment information. The PCE may then send a path computation reply 906 to the PCC. The reply 906 may comprise the IA-RWA.

Figure 10:
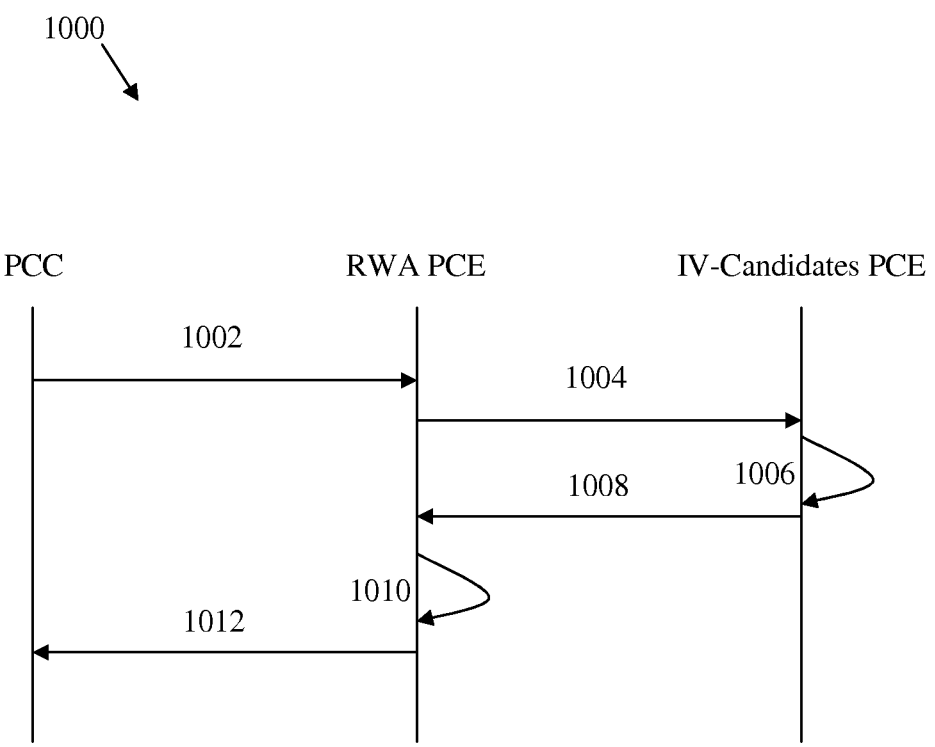
FIG. 10 is a protocol diagram of another embodiment of a path computation communication method.

FIG. 10 illustrates an embodiment of a path computation communication method 1000 between a PCC and at least two PCEs or computation entities. The two PCEs may be configured for separate RWA and IV, such as in the separate IA-RWA architecture 500 and the separate IA-RWA architecture 400. The method 1000 may be implemented using any suitable protocol, including, but not limited to, the new PCEP operations disclosed herein. In the method 1000, the PCC may send a path computation request 1002 to the RWA PCE. The request may comprise path computation information and path computation constraints. For example, the path computation information may comprise RWA information, including wavelength constraints. The path computation constraints may comprise quality constraints, e.g. between a first node (source node) and a second node (destination node), for a signal that may be represented by a specified type (or a class) and associated parameters. The RWA PCE may send an IV request 1004 to the IV PCE, which may be an IV-Candidates PCE. As such, the RWA PCE may ask for K paths and acceptable wavelengths for the paths between the two nodes indicated in the PCC request.

At 1006, the IV-Candidates PCE may perform IV, e.g. using approximate techniques/models, to obtain a list of validated paths and associated wavelengths. The IV-Candidates PCE may then send a reply 1008, which comprises the list of paths and wavelengths, to the RWA PCE. At 1010, the RWA PCE may perform RWA using the information from the IV-Candidates PCE and the received path computation information/constraints. The RWA PCE may then send a path computation reply 1012 to the PCC, which may comprise the IA-RWA.

Figure 11:
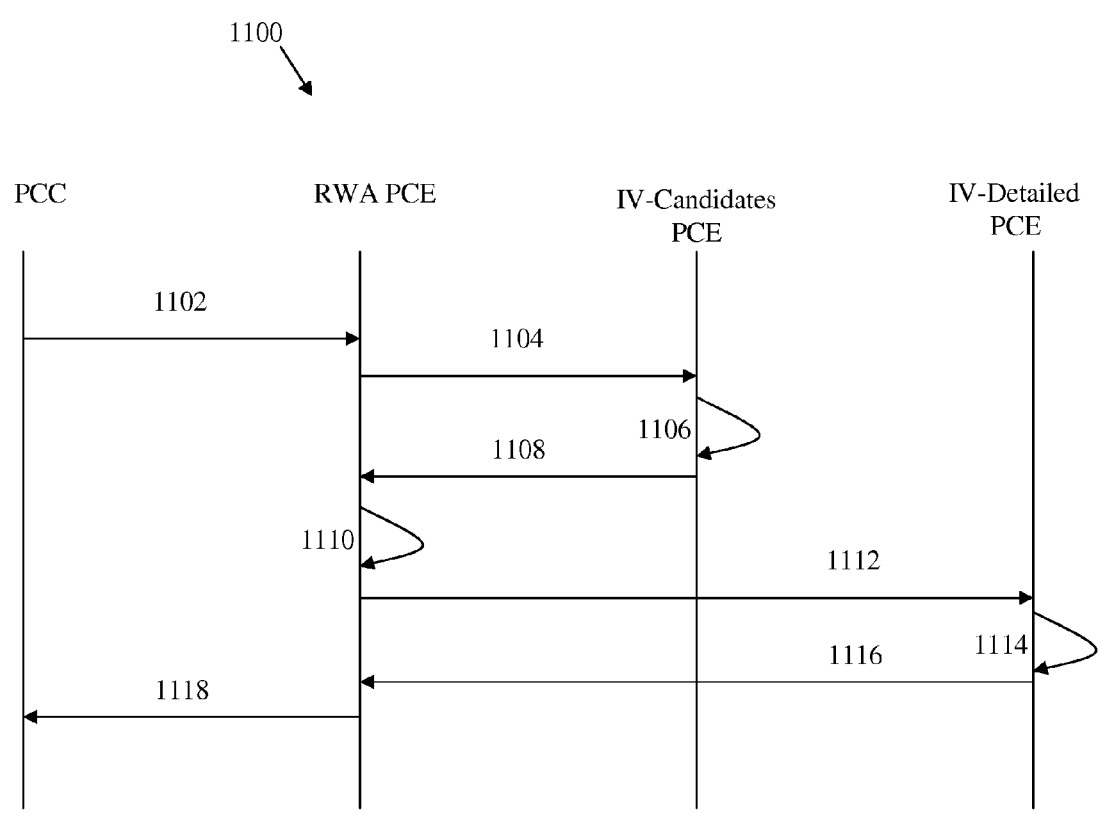
FIG. 11 is a protocol diagram of another embodiment of a path computation communication method.

FIG. 11 illustrates an embodiment of a path computation communication method 1100 between a PCC and a plurality of PCEs or computation entities. The PCEs may be configured for separate RWA and IV-Candidates and IV-Detailed processes, such as in the separate IA-RWA architecture 600 and the combined IA-RWA architecture 300. The method 1100 may be implemented using any suitable protocol including, but not limited to, the new PCEP operations disclosed herein. In the method 1100, the steps 1102, 1104, 1106, 1108, and 1110 between the PCC, the RWA PCE, and the IV-Candidates PCE may be configured substantially similar to the corresponding steps in the method 1000.

In step 1110 of the method 1100, the RWA PCE obtains the IA-RWA calculations. However, before sending the IA-RWA to the PCC, the PC RWA may send an IV request 1112 to the IV-Detailed PCE. As such, the RWA PCE may request a detailed verification of the calculated paths and assigned wavelengths from the IV-Detailed PCE. At 1114, the IV-Detailed PCE may perform IV, e.g. using detailed techniques/models, to validate the computed paths and corresponding wavelengths. The IV-Detailed PCE may then send a reply 1116 to the RWA PCE, to confirm or reject each computed path. The RWA PCE may update the list of paths and wavelengths based on the reply from the IV-Detailed PCE and then send a reply 1118 to the PCC, which may comprise the final IA-RWA.

When a network comprises a plurality of PCEs, not all the PCEs within the network may have the ability to perform IA-RWA or RWA. Therefore, the network may comprise a discovery mechanism that allows the PCC to determine the PCE in which to send the request, e.g. request 902, 1002, or 1102. For example, the discovery mechanism may comprise an advertisement from a PCC for an IA-RWA capable PCE or RWA capable PCE, and a response from the PCEs indicating whether they have such capability. The discovery mechanism may be implemented as part of the methods 900, 1000, and 1100 or as a separate process.

Figure 12:
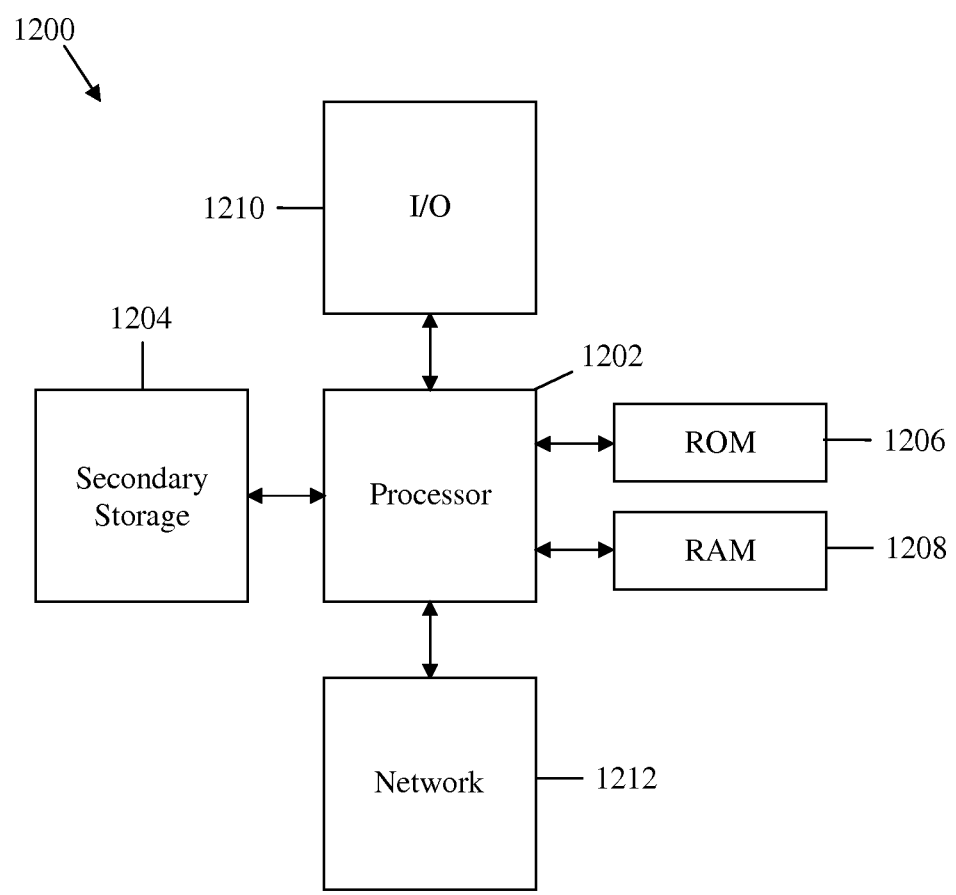
FIG. 12 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 12 illustrates a typical, general-purpose network component suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A wavelength switched optical network (WSON) comprising:
   a path computation element (PCE) configured to:
   receive a Path Computation Element Protocol (PCEP) Path Computation Request (PCReq) Message from a path computation client (PCC) that includes one or more optical signal quality parameters to which all computed paths must conform,
   wherein if the PCReq message does not include a Bit Error Rate (BER) limit and if no BER limit information related to the path request is provisioned at the PCE, then the PCE returns an error specifying that a BER limit must be provided.

2. The WSON of claim 1, wherein the optical signal quality parameters are selected from a group consisting of BER limit, Optical Signal Noise Ratio (OSNR) plus margin, optical signal power, Polarization Mode Dispersion (PMD), Residual Dispersion (RD), and Quality (Q) factor.

3. The WSON of claim 2, wherein margin is about three decibels (dB) to about six dB and is set against unpredictable degradation and fiber nonlinearity.

4. The WSON of claim 1 further comprising transmitting a PCEP path computation reply (PCRep) message that includes a computed route, wavelengths assigned to the route, and an indicator that indicates if the route conforms to an optical signal quality parameter.

5. The WSON of claim 1, wherein if a valid path is not found, the PCE is further configured to transmit a PCRep message that includes a reason why no path was found.

6. The WSON of claim 1, wherein the PCE is a Routing and Wavelength Assignment coordinating PCE (RWA-Coord-PCE), wherein the RWA-Coord-PCE is further configured to transmit a PCReq message to an impairment validation PCE (IV-Candidates-PCE), and wherein the PCReq message from the RWA-Coord-PCE to the IV-Candidates-PCE includes an indicator that more than one candidate path between a source and a destination is desired.

7. The WSON of claim 6, wherein the PCReq message from the RWA-Coord-PCE to the IV-Candidates-PCE includes a limit on a number of optical impairment qualified paths to be returned by the IV-Candidates-PCE.

8. The WSON of claim 6, wherein the PCReq message from the RWA-Coord-PCE to the IV-Candidates-PCE includes wavelength constraints.

9. The WSON of claim 6, wherein the PCReq message from the RWA-Coord-PCE to the IV-Candidates-PCE includes one or more specified paths and wavelengths to be verified by the IV-Candidates-PCE.

10. The WSON of claim 6, wherein by the RWA-Coord-PCE is further configured to receive a PCRep message from the IV-Candidates-PCE, wherein the PCRep message from the IV-Candidates-PCE to the RWA-Coord-PCE includes a set of optical impairment qualified paths along with any wavelength constraints on those paths.

11. The WSON of claim 10, wherein the PCRep message from the IV-Candidates-PCE to the RWA-Coord-PCE indicates that no path is found if a valid path is not found.

12. The WSON of claim 10, wherein once the RWA-Coord-PCE receives the paths from the IV-Candidates-PCE, the RWA-Coord-PCE computes RWA for the optical impairment qualified paths and sends the result to the PCC.

* * * * *